(12) United States Patent
Kennedy (10) Patent No.: US 7,683,888 B1
(45) Date of Patent: Mar. 23, 2010

(54) SHAPE DETECTING INPUT DEVICE

(75) Inventor: Peter Kennedy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1456 days.

(21) Appl. No.: 10/789,676

(22) Filed: Feb. 27, 2004

(51) Int. Cl.
*G06F 3/041* (2006.01)

(52) U.S. Cl. ...................................... 345/173; 345/156
(58) Field of Classification Search ......... 345/156–177, 345/204
See application file for complete search history.

(56) References Cited

U.S. PATENT DOCUMENTS

| | | | |
|---|---|---|---|
| 5,252,951 A * | 10/1993 | Tannenbaum et al. | 345/156 |
| 5,545,857 A * | 8/1996 | Lee et al. | 178/18.03 |
| 5,677,521 A | 10/1997 | Garrou | |
| 5,848,176 A * | 12/1998 | Hara et al. | 382/124 |
| 6,643,388 B1 * | 11/2003 | Yoo | 345/173 |
| 6,650,761 B1 | 11/2003 | Rodriguez et al. | |
| 6,792,287 B1 * | 9/2004 | Tuomela et al. | 345/173 |
| 7,002,556 B2 * | 2/2006 | Tsukada et al. | 345/173 |
| 7,289,824 B2 * | 10/2007 | Jerbi et al. | 455/556.1 |
| 2001/0030644 A1 * | 10/2001 | Allport | 345/173 |
| 2002/0080123 A1 | 6/2002 | Kennedy et al. | |

OTHER PUBLICATIONS

U.S. Appl. No. 10/927,925 entitled "Visual Expander" filed Aug. 26, 2004.

* cited by examiner

*Primary Examiner*—David L Lewis
(74) *Attorney, Agent, or Firm*—Beyer Law Group LLP (57) ABSTRACT

A system and method for recognizing a signet and for performing an action associated with the signet. In one embodiment, the method includes generating a touch signal with a signet, the touch signal representing a particular signet pattern, recognizing the particular signet pattern, and performing an action associated with the particular signet pattern.

20 Claims, 7 Drawing Sheets

SHAPE DETECTING INPUT DEVICE

BACKGROUND OF THE INVENTION

1. Field of the Invention

The present invention relates generally to an input device for a computer system. More particularly, the present invention relates to shape detection by an input device for a computer system.

2. Description of the Related Art

There exist today many styles of input devices for performing operations in a computer system. The operations generally correspond to moving a cursor and/or making selections on a display screen. By way of example, the input devices may include buttons or keys, mice, trackballs, touch pads, joy sticks, touch screens and the like. Each of these devices has advantages and disadvantages that are taken into account when designing or configuring a computer system.

Touch screens, in particular, are becoming increasingly popular because of their ease and versatility of operation as well as to their declining price. Touch screens allow a user to make selections and move a cursor by simply touching the display screen via a finger or stylus. For example, a user may make a selection by pointing directly to a graphical object displayed on the display screen. The graphical object may for example correspond to an on-screen button for performing specific actions in the computer system. In general, the touch screen recognizes the touch and position of the touch on the display screen and the computer system interprets the touch and thereafter performs an action based on the touch event. There are several types of touch screen technologies including resistive, capacitive, infrared and surface acoustic wave.

Computer based systems utilizing touch screens have been used in many settings including retail, commercial, industrial, office, hospitality, education, and gaming environments, etc. By way of example, popular applications include information kiosks, automated teller machines (ATM), point of sale machines (POS), industrial machines, gaming machines, arcade machines, vending machines, airline e-ticket terminals, restaurant reservation terminals, customer service stations, library terminals, learning devices, etc.

In environments utilizing POS machines, it is common practice to assign levels of authority to various individuals on the staff. For example, a sales clerk may be able to enter sales information but does not have the authority to make a refund. A supervisor is generally needed to execute a refund. The sales clerk and the supervisor may use the same POS terminal, but each of them will have a unique login code. Login codes are easily stolen or otherwise compromised. One well known solution to improve security is the use of physical keys. The owner of the physical key will know if it is stolen, whereas a stolen login code leaves no trace if stolen. Typically, physical keys are expensive and the terminals must be equipped with a locking mechanism that serve no function other than security.

Similar situations can be found in industrial settings where process conditions are tightly controlled. For example, an operator may be able to operate industrial machine but does not have authority to make changes to any of the process parameters associated with the industrial machine. In cases such as these, a supervisor is needed to make a change.

Similar situation may arise in work, libraries, and schools where computer terminals are shared by a number of different users. For example, a user may be able to use the computer terminal for general use but does not have the authority to make changes to the configuration of the computer or network to which it is attached. In cases such as these, a network administrator is needed to make changes.

Thus, there is a need for improved techniques to implement different authorization levels or other tasks using touch screens

SUMMARY OF THE INVENTION

The invention relates, in one embodiment, to a computer implemented method. The method includes generating a touch signal with a signet, the touch signal representing a particular signet pattern. The method also includes recognizing the particular signet pattern. The method further includes performing an action associated with the particular signet pattern.

The invention relates, in another embodiment, to a computer system. The computer system includes a touch screen that generates signet data associated with a signet pattern when a signet having the signet pattern is placed on the touch screen. The computer system also includes a computer that recognizes the signet data and that initiates an action associated with the recognized signet data.

The invention relates, in another embodiment, to a computer readable medium including at least computer code executable by a computer. The computer code includes storing shape data associated with one or more signets. The compute code also includes generating shape data based on contact with said touch sensative device. The computer code further includes comparing the generated shape data to the stored shape data. The computer code additionally includes performing an action associated with the stored shape data when the generated shape data matches the stored shape data.

The invention relates, in another embodiment, to a shape recognition method utilized in a computer based system having a touch sensative device. The shape recognition method includes providing baseline signet signals. The shape recognition method also includes generating a current signet signal when a signet is placed on the touch sensative device. The shape recognition method further includes comparing the current signal to at least one baseline signet signal. The shape recognition method additionally includes performing an action based on the current and baseline signet signals.

The invention relates, in another embodiment, to a signet system. The signet system includes a touch sensative area for receiving a signet having a signet pattern. The signet system also includes a detection system for generating a touch signal when the signet is presented to the touch sensative area and for extracting shape data associated with the signet pattern from the touch signal.

The invention relates, in another embodiment, to a computer implemented method. The method includes detecting contact with a touch screen. The method also includes generating shape information when contact is detected. The method further includes comparing the generated shape information with stored shape information. The method additionally includes determining a particular shape in contact with the touch screen based on the coparison. Moreover, the method includes initating an action associated with the particular shape when it is determined that the particular shape is the particular shape in contact with the touch screen.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1-9. However, those skilled in the art will readily appreciate that the detailed description given herein with respect to these figures is for explanatory purposes as the invention extends beyond these limited embodiments.

Figure 1:
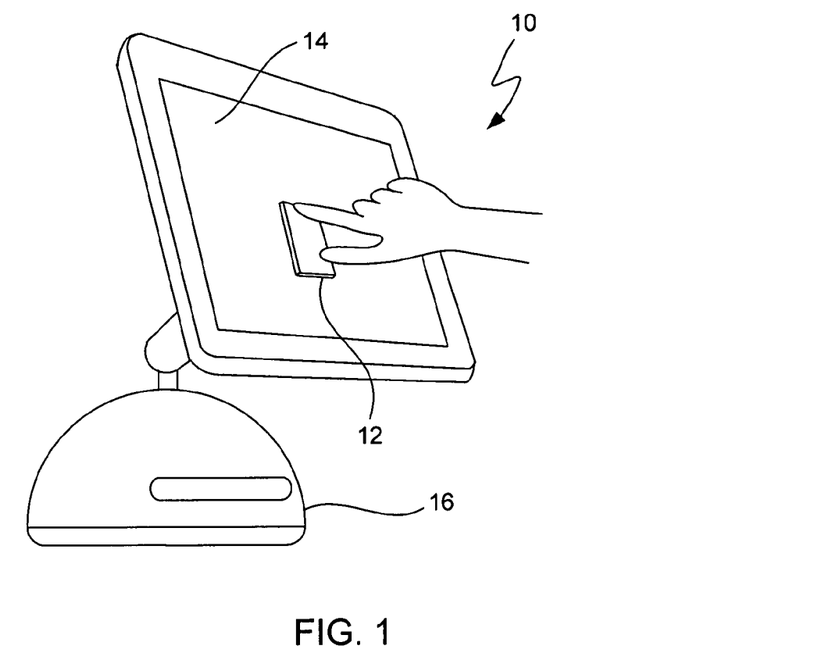
FIG. 1 is a computer system, in accordance with one embodiment of the present invention.

FIG. 1 is a computer system 10, in accordance with one embodiment of the present invention. The computer system 10 is generally configured to perform actions when a signet 12 is presented to a touch sensing device, such as a touch screen 14 of the computer system 10. The signet 12 preferably includes a signet pattern that can be acquired by the touch screen 14 when the signet 12 is placed adjacent the touch screen 14. In operation, the touch screen 14 generates signet data associated with the signet pattern and forwards the signet data to a computer 16. When the computer 16 recognizes the signet data, the computer 16 initiates an action associated with the signet data. The actions, may for example, include logging onto a computer or a computer network, permitting authorized individuals access to restricted areas of the computer or computer network, loading a user profile associated with a user's preferred arrangement of the computer desktop, permitting access to web content, launching a particular program, opening a file or document, viewing a menu, making a selection, executing instructions, encrypting or decoding a message, operating an input/output device operatively connected to the computer and/or the like.

The signet 12 and its pattern may be widely varied. The signet 12 may, for example, correspond to a ring, a tag, a token, a stamp, and or the like. The signet pattern may be the shape of the signet 12 itself, or it may be a pattern formed on the signet 12. For example, the signet pattern may be formed from a raised or recessed portion of the signet 12. The signet pattern may include one or more simple shapes such as circles, squares, triangles, etc., and/or may include one or more complex shapes such as icons, logos, symbols, text, etc. In some cases, it may even be formed from one or more dots or lines. In any event, the signet pattern is typically configured in such a way so that it can be pressed against the substantially planar touch screen.

The touch screen 14 may also be widely varied. By way of example, it may be based on sensing technologies including but not limited to resistive, capacitive, acoustic wave, infrared and the like. In one implementation, the touch screen is configured with plurality of sensor coordinates or nodes that represent different points on the touch screen. When the signet 12 is pressed against the touch screen 14, one or more sensor coordinates or nodes are activated. The activated nodes represent the signature or shape of the signet pattern. The touch screen 14 may be configured to process this information itself before sending it to the computer 16 or to simply pass it to the computer 16 without performing any processing steps.

Figure 2:
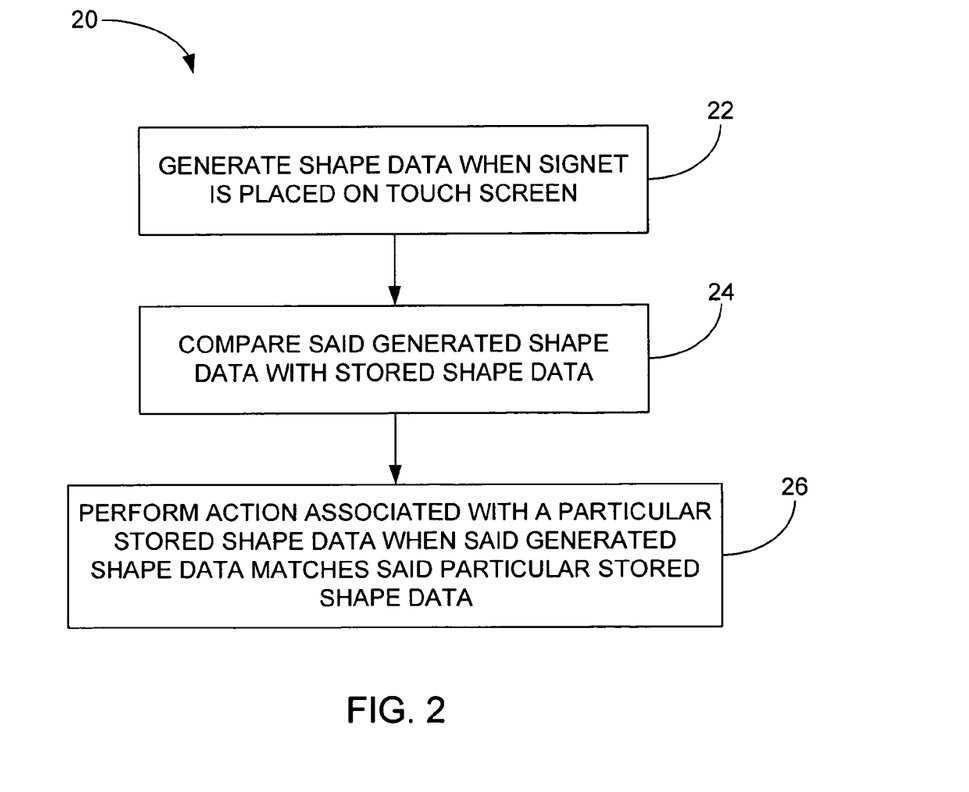
FIG. 2 is a shape recognition method, in accordance with one embodiment of the present invention.

FIG. 2 is a shape recognition method 20, in accordance with one embodiment of the present invention. The method 20 may for example be used in the computer system shown in FIG. 1. The method 20 generally begins at block 22 where shape data is generated when a signet is placed on the touch sensitive surface of a touch screen. The shape data generally includes shape information associated with a signet pattern. Following block 22, the process flow proceeds to block 24 where the generated shape data is compared with stored shape data. The stored shape data is contained in a library or database and typically includes shape data corresponding to one or more signets. The stored shape data is generally predetermined. By way of example, a calibration sequence may be used to update the stored shape data. Following block 24 the process flow proceeds to block 26 where an action associated with a particular stored shape data can be performed when the generated shape data matches the particular stored shape data. The action associated therewith can be predetermined and the predetermination may be part of a calibration sequence.

Figure 3:
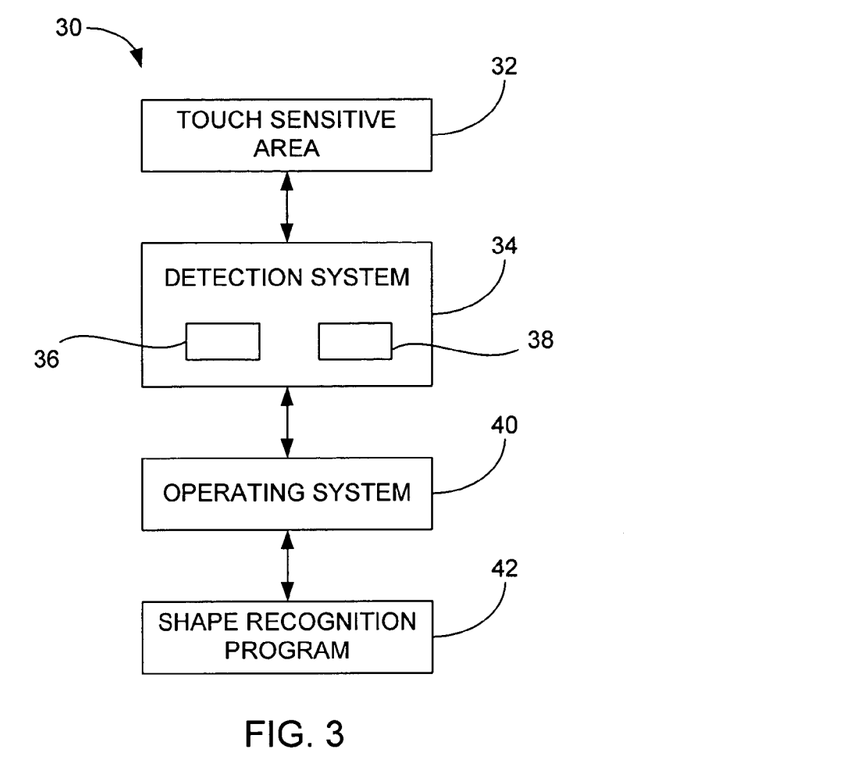
FIG. 3 is a simplified diagram of a shape recognition system, in accordance with one embodiment of the present invention.

FIG. 3 is a simplified diagram of a shape recognition system 30, in accordance with one embodiment of the present invention. The shape recognition system 30 is configured to perform shape recognition, particularly to recognize the shape or signature of a signet. The system 30 may for example be used in the computer system shown in FIG. 1. The system 30 includes a touch sensitive area 32 for receiving the signet. The system 30 further includes a detection system 34 capable of detecting the shape or signature of the signet. The detection system 34 may for example include a sensing device 36 configured to register touches positioned over the touch sensitive area, and control circuitry 38 that monitors the touch events and translates the touch events into other events in conjunction with its programming.

The sensing device 36 may for example correspond to resistive, capacitive, acoustic wave, infrared sensing devices and the like. The control circuitry 38, on the other hand, typically includes a controller and a processor (not shown). The controller is configured to convert the touches into touch events. The processor is responsible for interpreting the touch events and transmitting the results to other devices. In one particular operation, the controller monitors the signals from the sensing device 36 and passes signals representative of the touch signals to the processor.

The programming may for example include an operating system 40 and a shape recognition program 42. Operating systems are generally well known and will not be described in greater detail. By way of example, the operating system may correspond to OS/2, DOS, Unix, Linux and the like. The shape recognition program 42, which may be part of the operating system or a separate piece of software, generally includes a set of instructions that recognizes signet touch events and informs a system of the signet touch events and/or what action to take in response to the signet touch events.

Figure 4:
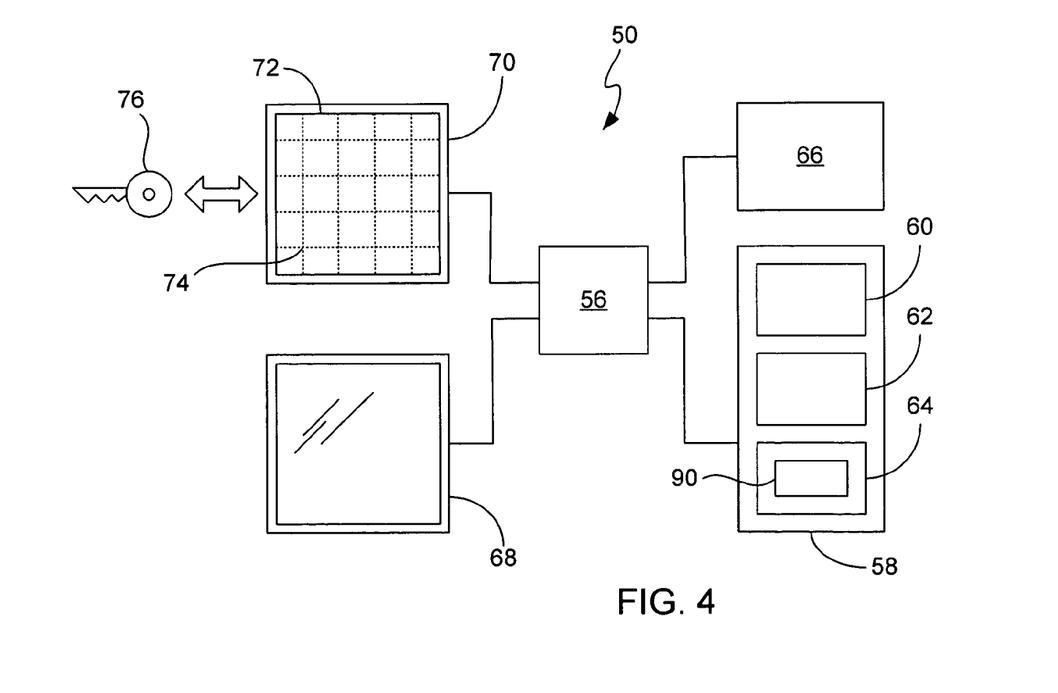
FIG. 4 is a block diagram of a computer system, in accordance with one embodiment of the present invention.
Figure 5:
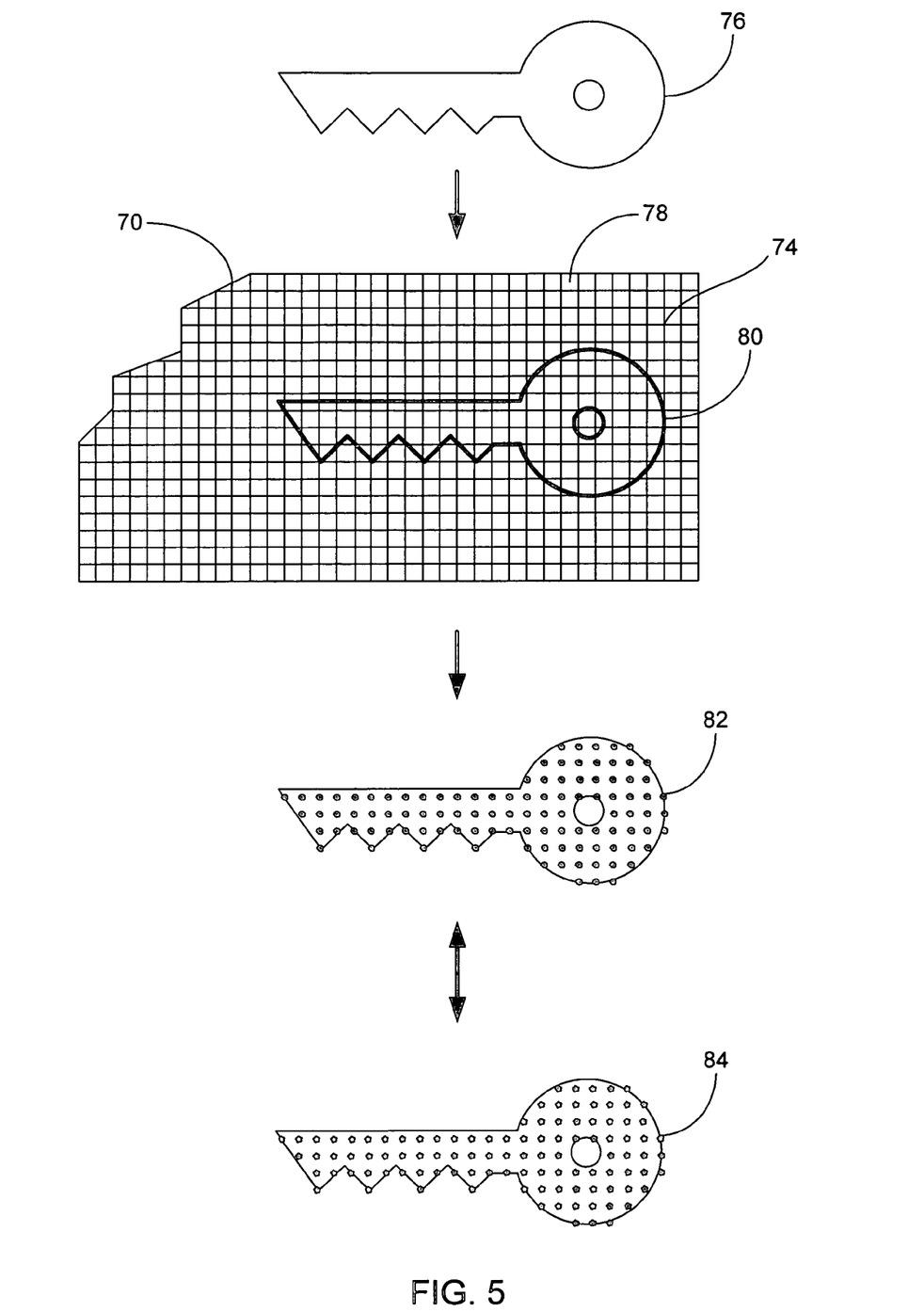
FIG. 5 is a diagram of a signet recognizing methodology, in accordance with one embodiment of the present

FIG. 4 is a block diagram of a computer system 50, in accordance with one embodiment of the present invention. The computer system 50 may correspond to personal computer systems such as desktops, laptops or handhelds, or to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

As shown, the computer system 50 includes a processor 56 configured to execute instructions and to carry out operations associated with the computer system 50. For example, using instructions retrieved for example from memory, the processor 56 may control the reception and manipulation of input and output data between components of the computing system 50. The processor 56 can be a single-chip processor or can be implemented with multiple components.

In most cases, the processor 56 together with an operating system operates to execute computer code and produce and use data. The computer code and data may reside within a program storage block 58 that is operatively coupled to the processor 56. Program storage block 58 generally provides a place to hold data that is being used by the computer system 50. By way of example, the program storage block may include Read-Only Memory (ROM) 60, Random-Access Memory (RAM) 62, hard disk drive 64 and/or the like. The computer code and data could also reside on a removable storage medium and loaded or installed onto the computer system when needed. Removable storage mediums include, for example, CD-ROM, PC-CARD, floppy disk, magnetic tape, and a network component.

The computer system 50 also includes input/output (I/O) circuitry 66 that is operatively coupled to the processor 56. The I/O circuitry 66 may be integrated with the processor 56 or it may be a separate component as shown. The I/O circuitry 66 is generally configured to control interactions with one or more I/O devices that can be coupled to the computer system 50. The I/O circuitry 66 generally operates by exchanging data between the computer system 50 and the I/O devices that desire to communicate with the computer system 50. In some cases, the I/O devices may be connected to the I/O circuitry 66 through wired connections. In other cases, the I/O devices may be connected to the I/O circuitry 66 through wireless connections. By way of example, the data link may correspond to PS/2, USB, IR, RF, Bluetooth or the like.

The computer system 50 also includes a display device 68 that is operatively coupled to the processor 56. The display device 68 is configured to display a graphical user interface (GUI) including perhaps a pointer or cursor as well as other information to the user. By way of example, the display device 68 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like.

The computer system 50 also includes a touch actuator, such as a touch screen 70, that is operatively coupled to the processor 56. In most cases, the touch screen 70 is transparent panel that is positioned in front of the display device 68. The touch screen 70 may be integrated with the display device 68 or it may be a separate component. The touch screen 70 is configured to receive input from a user's touch and to send this information to the processor 56. In most cases, the touch screen 70 recognizes touches and the position of touches on its surface. The touch screen 70 reports the touches to the processor 56 and the processor 56 interprets the touches in accordance with its programming. For example, the processor 56 may initiate a task in accordance with a particular touch.

The touch screen 70 generally includes a sensing device 72 configured to detect an object in close proximity thereto and/or the pressure exerted thereon. The sensing device 72 may be widely varied. In one particular embodiment, the sensing device 72 is divided into several independent and spatially distinct sensing points, nodes or regions 74 that are positioned throughout the touch screen 70. The sensing points 74, which are typically hidden from view, are dispersed about the touch screen 70 with each sensing point 74 representing a different position on the surface of the touch screen 70 (or touch screen plane). The sensing points 74 may be positioned in a grid or a pixel array where each pixilated sensing point 74 is capable of generating a signal. In the simplest case, a signal is produced each time an object is positioned over a sensing point 74. When an object is placed over multiple sensing points 74 or when the object is moved between or over multiple sensing point 74, multiple signals are generated.

The number and configuration of the sensing points 74 may be widely varied. The number of sensing points 74 generally depends on the desired sensitivity as well as the desired transparency of the touch screen 70. More nodes or sensing points generally increases sensitivity, but reduces transparency (and vice versa). By way of example, a resolution of 100 nodes per inch may provide a good balance between sensitivity and transparency. With regards to configuration, the sensing points 74 generally map the touch screen plane into a coordinate system such as a Cartesian coordinate system, a Polar coordinate system or some other coordinate system. When a Cartesian coordinate system is used(as shown), the sensing points 74 typically correspond to x and y coordinates. When a Polar coordinate system is used, the sensing points typically correspond to radial (r) and angular coordinates ($\theta$).

Although not shown, the touch screen 70 also may include a microcontroller that acquires the data from the sensing device 72 and that supplies the acquired data to the processor 56. In one embodiment, the microcontroller is configured to send raw data to the processor 56 so that the processor 56 processes the raw data. For example, the processor 56 receives data from the microcontroller and then determines how the data is to be used within the computer system 50. In another embodiment, the microcontroller is configured to process the raw data itself. That is, the microcontroller reads the pulses from the sensing points 74 and turns them into other form factors before sending or reporting them to the processor 56. By way of example, the microcontroller may convert the raw data into processed data that the processor 56 can understand. This processed data may have similar or different units as the raw data.

The microcontroller may include a storage element for storing a touch screen program, which is a capable of controlling different aspects of the touch screen 70. For example, the touch screen program may contain what type of value to output based on the sensing points 74 selected (e.g., coordinates). In fact, the microcontroller in conjunction with the touch screen program may follow a predetermined communication protocol. As is generally well known, communication protocols are a set of rules and procedures for exchanging data between two devices. Communication protocols typically transmit information in data blocks or packets that contain the data to be transmitted, the data required to direct the packet to its destination, and the data that corrects errors that occur along the way.

In one implementation, the microcontroller corresponds to an application specific integrated circuit (ASIC), which works with firmware to monitor the signals from the sensing device 72 and to process the monitored signals and to report this information to the processor 56.

In one embodiment, the touch screen 70 is based on resistive sensing. In one configuration, the resistive touch screen is a multilayer sandwich that consists of at least a top layer and a bottom layer. The opposing inner surfaces of the top and bottom layers each include a transparent conductive coating. The two layers are held apart by spacers in order to that prevent contact between the conductive coatings when the touch screen is not touched or depressed. When the outer front surface of the touch screen is deformed or pressed, the two conductive coatings are brought into electrical contact with one another and a change in electric field is noted by the microcontroller or processor.

The conductive coatings are typically patterned in rows on one surface and columns on opposing surface thereby forming a grid. By way of example, the conductive coating of the top layer may include electrodes positioned in rows while the conductive coating of the bottom layer may include electrodes positioned in columns (e.g., orthogonal). When electrical contact is made at the intersection of a row and a column a distinct switch is closed, i.e., each switch is associated with a particular row and column. As should be appreciated, the distinct switch may represent a particular coordinate on the plane of the touch screen (e.g., sensing point 74). In most cases, the microcontroller detects which of the switches are closed and passes this information to the processor. The microcontroller may translate this information into something that can be better understood by the processor. For example, the microcontroller may use the electrical signals from the rows and columns to determine the coordinates associated with the switches that are closed (position signals).

The signals generated at the sensing points 74 of the touch screen 70 are generally used to perform various functions including but not limited to moving a cursor or pointer (e.g., tracking) or for making selections. For example, if a user desires to actuate a virtual button on the display device 68, the user simply places their finger or stylus over the virtual button. The microcontroller outputs the position data representative of the position of the finger or stylus on the touch screen 70, and the processor 56 determines if the position data corresponds to the position of the virtual button. If the position of the finger corresponds to the location of the virtual button on the display device 68, then the processor 56 initiates an action associated with the virtual button.

In accordance with one embodiment of the present invention, the signals generated at the sensing points 74 of the touch screen 70 are also used to determine the shape of a patterned signet 76. By way of example and referring to FIG. 5, each portion of a signet 76 in contact with a signet receiving area 78 of the touch screen 70 produces a contact patch area 80. The contact patch area 80 covers several sensing points 74 thus generating several signals. The signals may be grouped together to form a signet signal 82 representative of the pattern of the signet 76. In essence, the signet signal 82 represents a pixilated image of the signet 76 in contact with the touch screen 70. The signet signal 82 generated at the touch screen may be compared to one or more baseline signet signals 84 stored in the computer system 50 to determine what action to perform. The baseline signet signal may for example be preset or trained before use. If the current signet signal 82 is similar to the baseline signet signal 84 then the computer system can perform action(s) previously associated with the baseline signet signal 84. The user may customize the computer system 50 by setting the actions(s) associated with the baseline signet signal 84 before use (e.g., calibration). The actions, may for example, configure the computer system for a particular use or permit an operator access to restricted areas of the computer system.

Referring back to FIG. 4, the program storage block 58 may store a shape recognition program 90 for discerning shape information sent by the touch screen 70. For example, comparing a current signet signal to a baseline signet signal. The shape recognition program 90 may be stored in ROM 60, RAM 62, hard drive 64 (as shown) and/or some other storage device. ROM 60 is typically more secure but much harder to make changes as for example when a new signet is desired to be added into the shape recognition program. Alternatively or additionally, a shape recognition program or some variation thereof may be stored in the touch screen 70 itself (e.g., firmware).

The shape recognition program 90 may contain baseline signet signals associated with different actions. The signet signals generally contain shape information of a particular signet while the actions describe what type of action to perform based on the signet signal. In one implementation, the signet signals may be accessed by a user through a signet menu, which may be viewed on the display device 68 as part of a GUI interface. The signet menu may include signet settings pertaining to the signet signals and signet actions. In fact, the signet menu may serve as a control panel for reviewing and/or customizing the signet settings, i.e., the user may quickly and conveniently review the signet settings and make changes thereto. Once changed, the modified signet settings will be automatically saved and thereby employed to handle future shape recognition processing. The signet menu may also be used as part of a training sequence for training the computer to a particular signet.

Furthermore, the shape recognition program 90 may define the signet receiving area 78 of the touch screen 70. The signet receiving area 78 may correspond to the entire touch screen 70 or some subset of the touch screen 70. The subset may be a particular region of the GUI where the user places the signet 76 or some other predetermined area of the touch screen 70 where the user places the signet 76, i.e., right bottom corner. In some cases, the user may select a signet icon that opens a pop window that asks the user to place the signet 76 in a particular area. In other cases, the user is prompted by the system to place signet 76 on the touch screen 70 based on a previous user action. For example, if access is requested by a user, the system may request that the user place a signet on the touch screen if they in fact want to gain access.

The pattern recognition program 90 may also include features for orienting the signet to a grid. As should be appreciated, if the signet 76 is skewed relative to the coordinate system of the sensing device pattern recognition becomes more complicated. Alternatively, the recognition program 90 may present an image of the signet in the signet receiving area on the touch screen. The user simply aligns the signet 76 with the image thereby placing the signet 76 in the correct position for shape recognition.

Although not a requirement, the shape recognition programming may be very high in hierarchy of interrupts in the operating system. That is, determining whether the touch is a signet and thereafter the shape of the signet would take precedent over other types of processing actions. For example, if a virtual button is display on the screen, the user is allowed to place the signet over the virtual button and the computer system would read the pattern on the signet and perform an action associated therewith rather than activating the on-screen virtual button.

Figure 6:
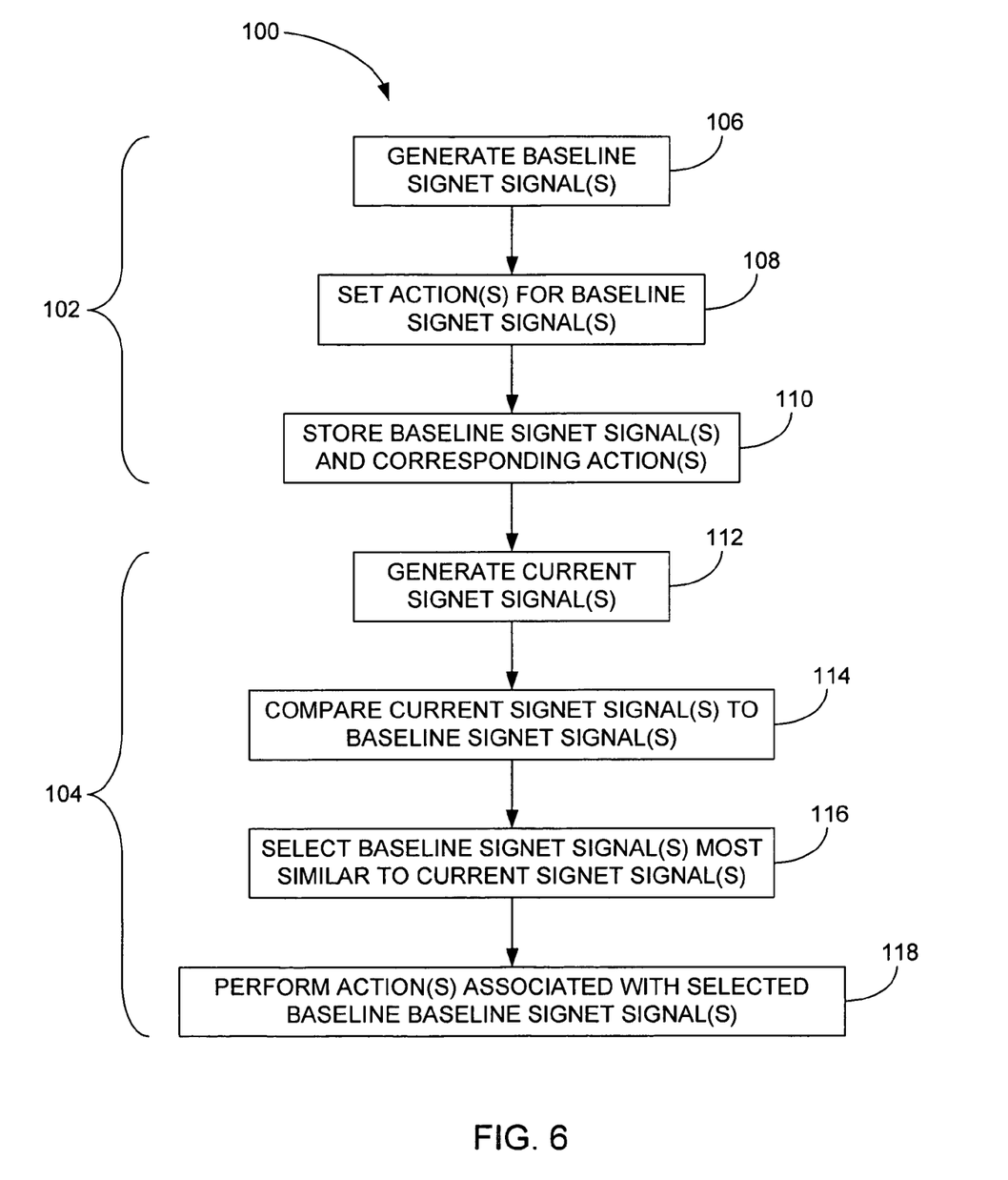
FIG. 6 is a signet method, in accordance with one embodiment of the present invention.

FIG. 6 is a signet method 100, in accordance with one embodiment of the present invention. The method 100 is generally performed in multiple steps including a calibration step 102 and an in-use step 104. The calibration step 102 is performed before the in-use step. The calibration step 102 is generally performed once, while the in-use step is performed as needed during computer use. The calibration step 102 generally begins at block 106 where baseline signet signals are generated for each signet. This may for example be accomplished by placing one or more signets on a touch sensing device such as a touch screen. The signet signals are based on the shape of the signet. Following block 106, the process flow proceeds to block 108 where the actions for one or more baseline signet signals are set. For example, a first action may be connected with a first baseline signet signal and a second action may be connected to a second baseline signet signal (and so on). In addition, a third action may be connected to both the first and second baseline signals. Following block 108, the process flow proceeds to block 110 where the baseline signet signal and action(s) associated therewith are stored, such as in a signet database. The signet database may for example be associated with a shape recognition program stored in memory.

The in-use step 104 generally begins at block 112 where a current signet signal is generated. This may for example be accomplished by placing one or more signets on a touch sensing device such as a touch screen. Following block 112, the process flow proceeds to block 114 where the current signet signal is compared to the baseline signet signals stored in the signet database. Following block 114, the process flow proceeds to block 116 where the baseline signet signal most similar to the current signet signal is selected. By way of example, the difference between the baseline and current signal may be found. If this difference is minimal or within a desired threshold then it can be assumed that a match has been made. If there is no signal similar to the current signal then the user may be prompted to repeat the use steps 104. Following block 116, the process flow proceeds to block 118 where the actions associated with the selected baseline signet signal are performed.

FIGS. 7A-F show various examples of a signet 120 that may used in the embodiments of the present invention. In each of these figures, the signet 120 includes a signet pattern 122. The signet pattern 122 may be preprogrammed with a computer system to perform an action. The action may for example configure the system to a particular user such as a person (e.g., Bob Smith) or authority (e.g., manager), open restricted areas of the computer system or initiate a control function (e.g., turn on lights).

The pattern 122 may be any shape whether simple or complex. Some examples of patterns include circles, squares, triangles, dots, dashes, coat of arms, logos, symbols, text and the like. Other examples include binary patterns and Braille symbols. The pattern may be related to the action to be performed. For example, the pattern may be in the form of a conventional key for actions associated with gaining access to restricted areas, or in the form of a light bulb for actions associated with turning a light on and off. In some cases, the signet pattern may include an alignment mark for helping determine the orientation of the signet pattern relative to the touch screen, i.e., helps the pattern recognizer to determine orientation. The alignment mark may for example be a cross that helps distinguish the pattern relative to an x and y coordinate system. As should be appreciated, simple shapes are more easily counterfeited and thus complex shape may be desired. For example, a large circle may be relatively easy to counterfeit, whereas a complex series of dots may harder to counterfeit.

The signet pattern 122 is generally configured to be substantially planar in order to match the planar surface of the touch screen. The signet pattern 122 may be a positive pattern (e.g., raised portions) or a negative pattern (e.g., recessed portions). The portions of the signet that contact the touch screen as for example the signet or the signet pattern may be formed from various materials although plastic, rubber and electrometric materials are typically preferred in order to protect the touch screen. The signet itself may be formed from any suitable material including plastic, metal and the like. Moreover, the signet pattern may be integrally formed with the signet or it may be attached as for example using adhesives or other fastening means. By way of example, a rubber signet pattern may be glued to a plastic signet.

Figures 7A, 7B, 7C, 7D, 7E, 7F, 7G:
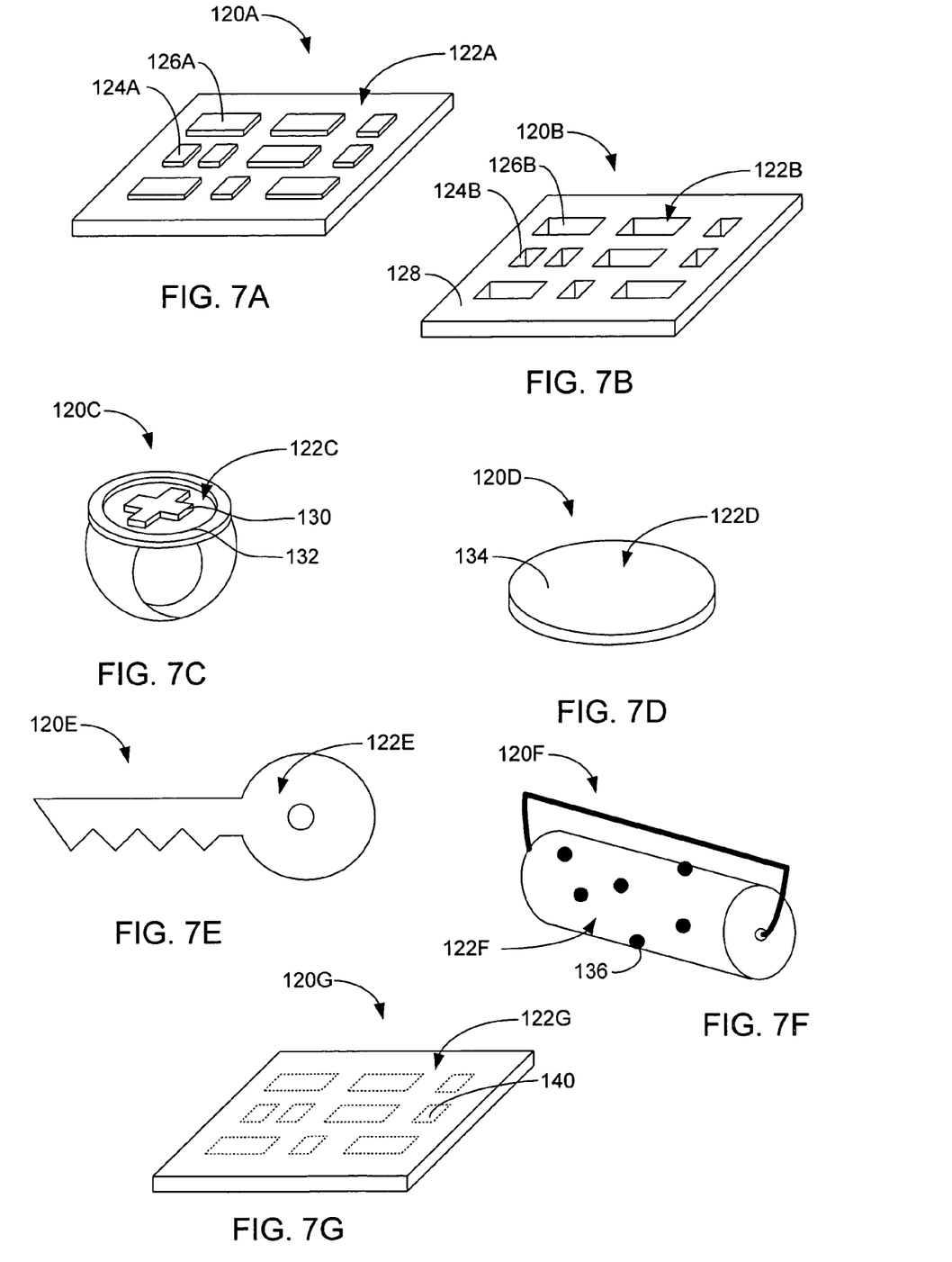
FIGS. 7A-G are diagrams of signets, in accordance with several embodiments of the present invention

FIGS. 7A and 7B are diagrams of a signet card (or tag) 120A and 120B, respectively. The signet card 120A includes a raised pattern 122A of lines 124A and dots 126A. When pressed against a touch screen, the raised pattern 122A forms a contact patch area of lines and dots that is read by the touch screen. The signet card 120B, on the other hand, includes a recessed pattern 122B in the form of lines 124B and dots 126B. When pressed against a touch screen, the surface 128 of the signet 120B other than the recessed portions 124B and 126B forms a contact patch area that is read by the touch screen (reverse pattern of FIG. 7A). Alternatively or additionally, the lines or dots may be replaced by text including letters and numbers. By way of example, the signet card may be a credit card or ATM card that already includes a series of raised numbers.

FIG. 7C is a diagram of a signet ring 120C. Like the card, the ring 120C may include a raised or recessed pattern. In the illustrated embodiment, the ring 120C includes a raised pattern 122C consisting of a letter 130 and a border 132. In particular, the letter "X" surrounded by a circle "0". When pressed against a touch screen, the raised pattern 122C forms a contact patch area consisting of an "X" surrounded by a circle "0" that is read by the touch screen. In some cases, the pattern may include multiple letters, which can include names, acronyms, monograms, initials, and the like or a symbol. The signet ring 120C may be assembled like conventional jewelry so as to make the signet ring 120C less conspicuous. For example, it may be formed from precious metals, and may include gems attached thereto.

FIG. 7D is a diagram of a signet token 120D. The signet token 120D does not include a raised pattern or a recessed pattern. The shape of the signet token 120D itself defines the pattern of the signet. When pressed against the touch screen, the entire surface 134 of the signet token 120D forms a contact patch area. Alternatively, a raised or recessed pattern may be employed on the surface of the signet token 120D.

FIG. 7E is a diagram of a signet key 120E. Like the token the shape of the signet key 120E defines the pattern of the signet. The key may be a plastic key or conventional metal key. In fact, the signet key may actually correspond to the user's house key. With this in mind, the signet key 120E may include an opening, or slot like conventional keys. These particular features act like the recesses described above, i.e., does not form part of the contact patch area.

FIG. 7F is a diagram of a signet roller 120F, which produces the signet pattern 120F when rolled along the surface of the touch screen. The signet roller 120F may include a series of raised dots 136 for example in a manner similar to a music box roll. When pressed and rolled along the surface of the touch screen, the raised dots 136 form a contact patch area that extends along the perimeter of the roller. The raised dots may also be lines or other shapes.

FIG. 7G is a diagram of a signet card 120G with a programmable signet pattern 122G. The signet 120G includes a series of chads 140 that may be punched out of the signet card 120G to form a unique pattern 122G. The holes formed by the punched out chads 140 may for example represent a particular code. The chads 140 may be any shape although they typically come in the form of dots, dashes or lines.

Figure 8:
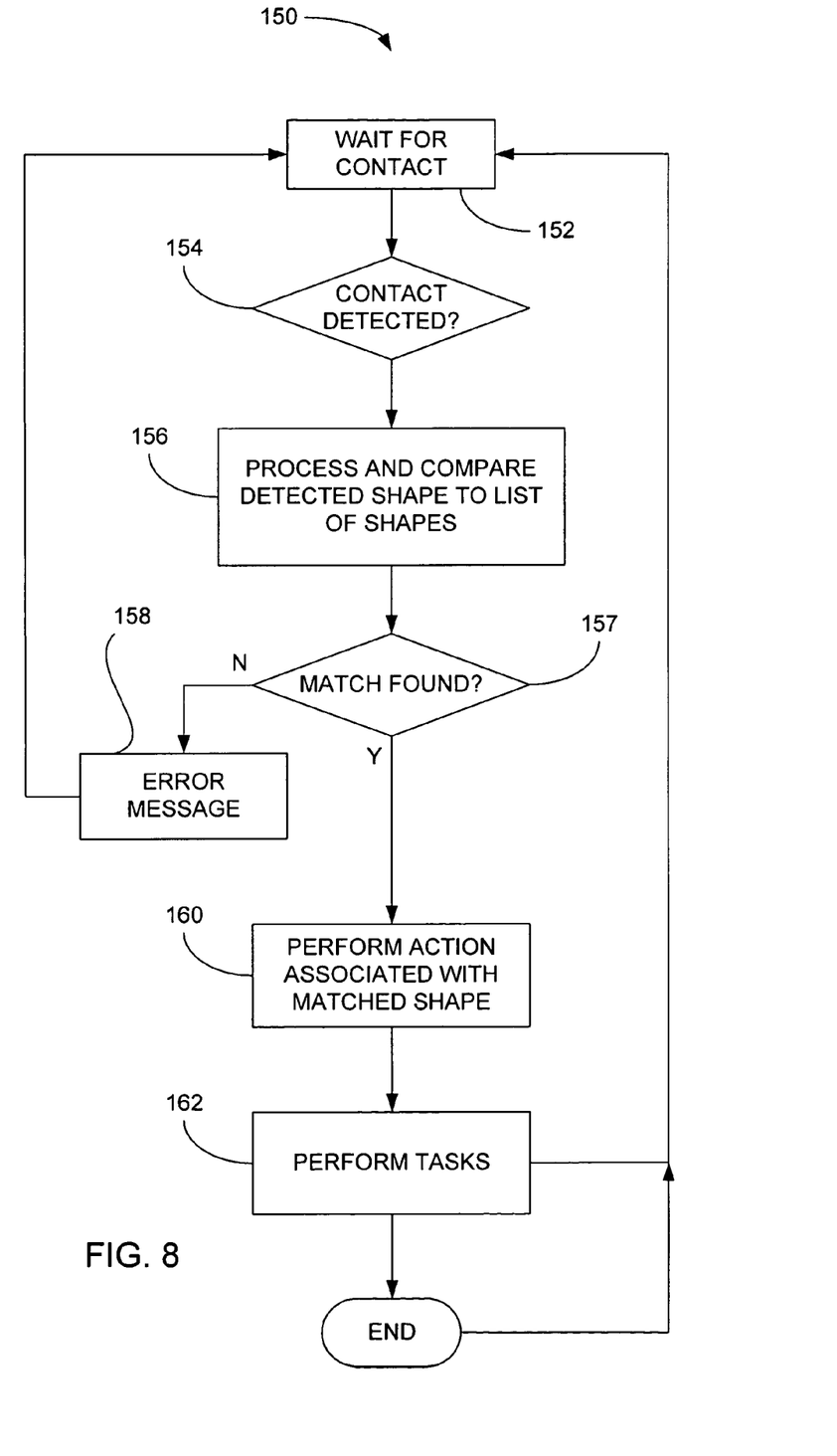
FIG. 8 is a shape recognition method, in accordance with one embodiment of the present invention.

FIG. 8 is a shape recognition method 150, in accordance with one embodiment of the present invention. By way of example, the method 150 may be performed using the system shown in FIG. 3. The method 150 generally begins at block 152 where the touch screen is in standby. Standby generally implies that the touch screen is in a state of readiness waiting for something to happen, i.e., waiting for a user to place a signet on the touch screen. Following block 152, the process flow proceeds to block 154 where a determination is made as to whether contact has been made on the touch screen. If it is determined that there is no contact, then the process flow proceeds back to block 152 thereby keeping the touch screen in standby. If it is determined that the there is contact, then the process flow proceeds to block 156 where the shape of the contact area is compared to a list of signet shapes. If a match 157 is not found, the process flow proceeds to block 158 where an error message such as "no match found" or "invalid signet" or "signet not recognized please try again" is presented to the user to inform the user that the signet was not recognized. Thereafter, the process flow proceeds back to block 152. Alternatively, the process flow may skip block 158 altogether, i.e., present no message to the user.

If a match 157 is found, the process flow proceeds to block 160 where an action associated with the matched signet shape is performed. The actions may be widely varied. The actions may include for example, logging onto the computer or a computer network, permitting authorized individuals access to restricted areas of the computer or computer network, loading a user profile associated with a user's preferred arrangement of the computer desktop, permitting access to web content, launching a particular program, opening a file or document, viewing a menu making a selection, executing instructions, encrypting or decoding a message, operating an input/output device operatively connected to the computer, and/or the like.

In one embodiment, the action includes opening restricted areas within a computer system. After the restricted areas are opened, the process flow proceeds to block 162 where a user is allowed to perform authorized tasks. This particular implementation may be useful in retail environments where store clerks have authorization for performing low level transactions such as entering an order, but may not have authorization for performing high level transactions such as issuing a refund. In cases such as these, a store manager wielding a high level signet may be called over. The store manager simply places the high level signet on the touch screen in order to authorize a high level transaction that is performed either by the store manager or the store clerk. As should be appreciated, there may be different signets for different restricted areas and thus different levels of authorization. In order to log out of this level, the store manager may need to place the high level signet on the touch screen a second time. Alternatively, there may be an icon on the touch screen that initiates a log out when selected. Alternatively, the log out may occur after a predetermined amount of time, e.g., times out.

Along a similar vein, several signet keys may be issued with each key representing a different action. For example, a plant manger may have signets for turning an air conditioner unit on and off, turning exterior or interior lights on and off, operating a waste water system, a material feed system, and the like.

In another embodiment, the action may include configuring a computer system to a particular user. The user therefore does not have to fiddle with a lot of different controls. For example, once a match is found, the computer system configures itself in accordance with the user's previously programmed settings, including but not limited to sound volume, mouse speed, screen brightness, menus, preferences, access privedges, preferred network connection (telephone, modem, WiFi) and the like. This is particular advantageous in environments where the computer system is shared by multiple users, such as in education environments. Each user could have their own personal signet. The user simply has to present his/her ring to the touch screen in order to place the computer system in his/her preferred configuration. When the computer system has been properly configured, the process flow proceeds to block 162 where the user is allowed to perform tasks in the computer system. In order to log out of this level, the user may need to place the personal signet on the touch screen a second time. Alternatively, there may be an icon on the touch screen that initiates a log out when selected. Alternatively, the log out may occur after a predetermined amount of time, e.g., times out.

In some situations, it may be desirable to require multiple signets in order to perform an action. This may for example work like a combination lock. The multiple signets may further be required to be placed in a particular orientation relative to one another. The multiple signets may be similar or different, and may include symbols, numbers, letters, etc.

In one embodiment, two or more signets are detected on the surface of the touch screen at the same time and thereafter the combination is compared to a list of shapes including various combinations of shapes as in blocks 154 and 156. Like above, if there is a match the process flow proceeds to block 160 where an action associated with the matched signet shapes is performed. This particular implementation may be useful in situations where checks and balances are needed for the action to be performed. For example, in order to launch a rocket, two distinct signets owned by two different individuals may need to be presented to the touch screen in order to allow a rocket launching sequence to begin.

In another embodiment, one or more signets are detected on the surface of the touch screen at the different times and thereafter the signet sequence is compared to a list of signet sequences as in blocks 154 and 156. That is, each time a signet is placed on the touch screen the process flow performs steps 154 and 156 until the desired sequence is complete. If each signet in the signet sequence matches its appropriate shape in the sequence, the process flow can continue to block 160 where an action associated with the signet sequence is performed.

In another embodiment, the action is configured to launch a program that outputs personal identification or credit information associated with the signet. The user owning the signet simply places the signet on the touch screen so as to launch a program that brings up personal identification, credit information or the like. This may be advantageous in retail or financial environments such as stores or banks.

In another embodiment, the action is configured to open a particular program or web site. This may be down in conjunction with a promotional signet. If the owner of the signet has the winning signet the web site may indicate that the user has won something. The promotional signet may be bundled with other products or given out as for example at a trade show. In addition, there may be a promotional kiosk for receiving the promotional signets. That way, the owner can readily determine if they won anything.

In another embodiment, the action includes decoding or encrypting a message. That is, the signet could be used to encode or encrypt a message. The recipient of the message would also need a signet in order to decode or unencrypt the message. When the signet is implemented as a signet ring, the signet ring may be referred to as a decoder ring.

It should be noted that block 156 may include several sub steps including for example determining whether the contact is from a finger, stylus, or signet. For example, block 156 may include comparing all shapes in order to determine if the touch is from a finger, stylus or signet. As should be appreciated, the shape of fingers (oval) and stylus (point) are relatively similar and thus these may be easily filtered out. If a finger or stylus is detected, the method continues along a conventional touch screen operational path, i.e., tracking. If a signet is detected, the process flow proceeds to block 158.

Figure 9:
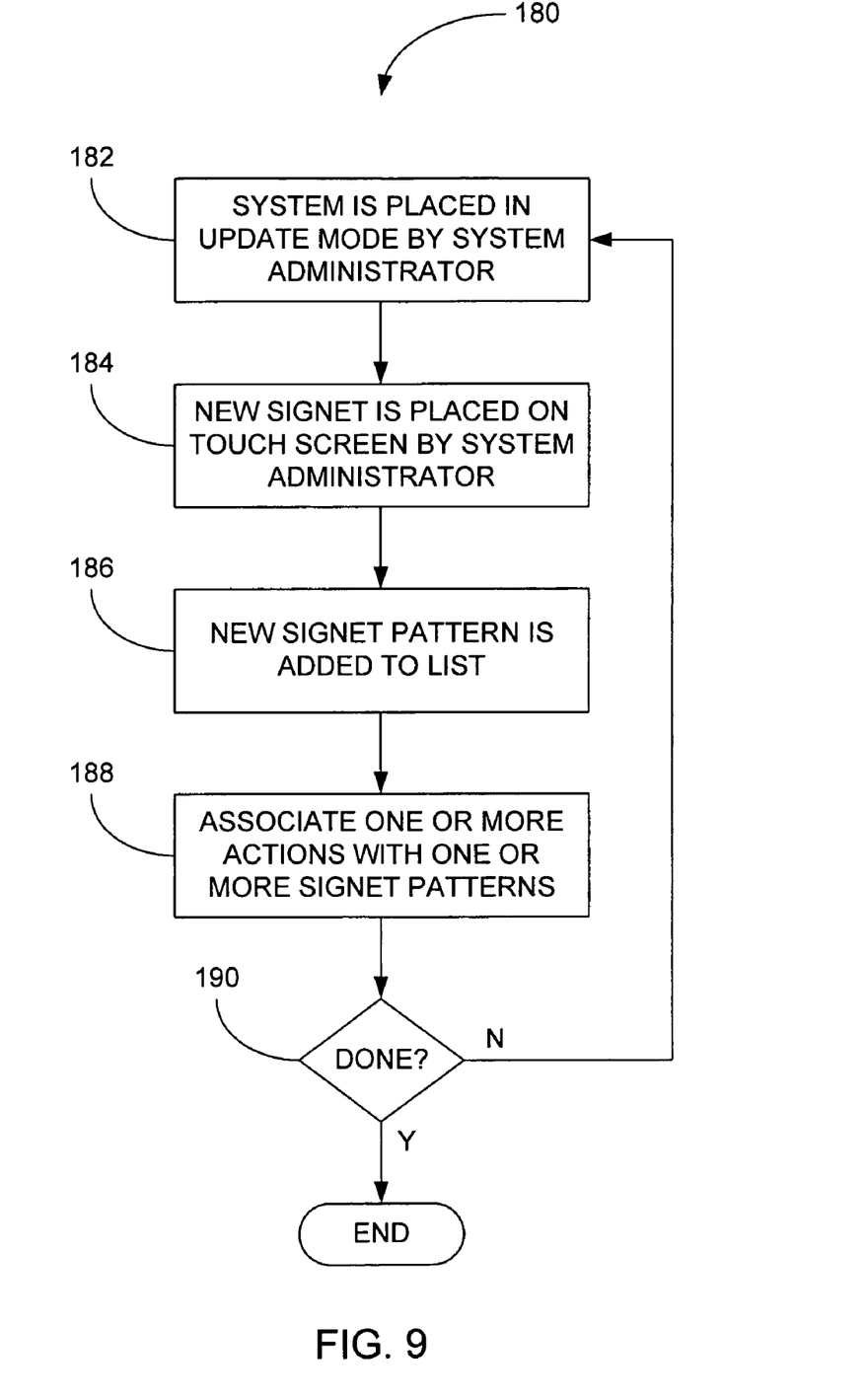
FIG. 9 is a signet update method, in accordance with one embodiment of the present invention.

FIG. 9 is a signet update method 180, in accordance with one embodiment of the present invention. The method 180 is generally configured for adding signets to a database or list. This method 180 may for example be performed before the method of FIG. 8 so that a list is available in block 156. The method 180 may also be performed at various times through a computer system's life in order to add new signets that were not part of an original batch.

The method 180 generally begins at block 182 where a computer system is placed in update mode by a system administrator. This may for example be accomplished using the method described above. For example, using a system administer signet, a system administrator may be able to access a signet update menu. Following block 182, the process flow proceeds to block 184 where a new signet is placed on the touch screen by the system administrator. The new signet may for example correspond to a new user such as a new store manager. Following block 184, the process flow proceeds to block 186, where a new signet pattern is added to the list. For example, the system administrator places the new signet pattern in a database that contains the shapes for various signets. Following block 186, the process flow proceeds to block 188 where one or more actions are assigned to the signet pattern. For example, the new signet may be assigned to allow the user to gain access to restricted areas inside the computer system. The new signet may also be assigned to configure the computer system in a particular manner. Following block 188, the process flow proceeds to block 190 where a decision is made with regards to adding another signet or ending the process flow. If another signet is to be added, then the process flow proceeds to back to block 184.

It should be noted that the methods described herein can be used alone or in various combinations. The methods may be implemented singularly or by a combination of hardware, software, and/or firmware. The methods can also be embodied as computer readable code on a computer readable medium. The computer readable medium is any data storage device that can store data, which can thereafter be read by a computer system. The computer readable medium can also be distributed over a network coupled computer systems so that the computer readable code is stored and executed in a distributed fashion.

It is also contemplated that the different embodiments of the present invention may be adapted for any of a number of suitable and known computer systems that process, send, retrieve and/or store data. For example, the computer systems may correspond to an IBM compatible computer or an Apple compatible computer. Further, the computer system may generally relate to personal computers such as desktop computers, laptop computers or handheld computers. By way of example, the Apple compatible computer may correspond to different models including but not limited to iMac, eMac, Cube, G3, G4, G5 models, which are manufactured by Apple Computer, Inc. of Cupertino, Calif.

Furthermore, it should be noted that the signet signals may come in various forms including but not limited to analog, digital, or other representations of the physical world in terms that are used internally to the mechanism of the computer and the like.

While this invention has been described in terms of several preferred embodiments, there are alterations, permutations, and equivalents, which fall within the scope of this invention. For example, although the invention has been directed at detecting signets on a touch screen, it should be noted that other input devices such as touch pads may be used. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of utilizing signet inputs, comprising:
   generating touch signals on a touch sensitive surface;
   determining whether a given touch signal is generated from a finger, stylus or signet;
   filtering out any finger or stylus generated touch signal as being a non-signet input;
   processing further any signet generated touch signals, with each such signet generated touch signal representing a particular shape or pattern of the respective generating signet itself;
   recognizing the particular signet shape or pattern; and
   performing an action associated with the particular signet shape or pattern.

2. The method as recited in claim 1 wherein said recognizing includes comparing the touch signal to one or more signet signals.

3. The method as recited in claim 1 wherein the action includes opening one or more restricted areas within a computer system.

4. The method as recited in claim 1 wherein the action includes configuring a computer system to a particular user.

5. The method as recited in claim 1 wherein the action is configured to launch a program.

6. The method as recited in claim 1 wherein the action includes encrypting or decoding a message.

7. The method as recited in claim 1 wherein said recognizing includes comparing the shape of a contact area with a list of signet shapes, and wherein the action is performed when the shape of the contact area matches the signet shape.

8. A computer system, comprising:
   a touch screen that generates signet data associated with a signet shape or pattern when a signet is placed on the touch screen; and
   a computer that
      determines whether a given contact on the touch screen is generated from a finger, stylus or signet,
      filters out any finger or stylus generated contact as being a non-signet input,
      recognizes the signet data for a signet contact on the touch screen, and
      initiates an action associated with the recognized signet data.

9. The computer system as recited in claim 8 wherein the action includes logging onto the computer system, permitting authorized individuals access to restricted areas of the computer system, loading a user profile associated with a user's preferred arrangement of the computer system, permitting access to web content, launching a program, opening a file or document, viewing a menu, making a selection, executing instructions, encrypting or decoding a message, or operating an input device.

10. The computer system as recited in claim 8 wherein the signet corresponds to a ring, a tag, a card, a token, a stamp, or a key.

11. The computer system as recited in claim 8 wherein the signet pattern corresponds to the shape of the signet.

12. The computer system as recited in claim 8 wherein the signet pattern is formed on the signet, the signet pattern being a raised or recessed portion of the signet.

13. The computer system as recited in claim 8 wherein the touch screen is configured with a plurality of sensor coordinates that represent different points on the touch screen, the sensor coordinates activating when the signet is pressed against the touch screen, the activated sensor coordinates representing the shape of the signet pattern.

14. A signet system, comprising:
- a signet having a distinctive shape or pattern thereon, wherein said signet is an inanimate object adapted to be manipulated by a user, and wherein said signet is selected from the group consisting of a roller signet, a punch card signet, and a ring signet adapted to be worn by the user;
- a touch sensitive area for placing said signet; and
- a detection system for generating a touch signal when the signet is presented on the touch sensitive area and for extracting shape or pattern data associated with the signet from the touch signal.

15. The signet system as recited in claim 14 wherein detection system includes a sensing device and a control device, the sensing device being configured to register touches on the touch sensitive area and the control device being configured to monitor the touches and to translate the touches into shape data.

16. The signet system as recited in claim 15 wherein the sensing device corresponds to a resistive sensing device, a capacitive sensing device, an acoustic wave sensing device or an infrared sensing device.

17. The signet system as recited in claim 15 wherein the control device includes a sensor controller and a processor, the sensor controller being configured to convert the touches into touch events, the processor being configured to interpret the touch events into shape data and to transmit the results to other components.

18. A computer readable medium storing at least computer code executable by a computer, the computer code comprising:
- storing shape data associated with one or more signets;
- determining whether a given touch signal on an associated touch sensitive device is generated from a finger, stylus or signet data;
- filtering out finger or stylus generated touch signal as being a non-signet input data;
- generating shape data based on a signet placed on said touch sensitive device;
- comparing the generated shape data to the stored shape data; and
- performing an action associated with the stored shape data when the generated shape data matches the stored shape data wherein the shape data is the shape of the signet itself.

19. The signet system of claim 18, further comprising:
- a plurality of signets having a multiplicity of distinctive shapes or patterns thereon, wherein each of said plurality of signets is an inanimate object adapted to be manipulated by a user.

20. The signet system of claim 19, wherein said plurality of signets are provided to users as part of a promotion, and wherein said plurality of promotional signets include one or more winning signets.

* * * * *

UNITED STATES PATENT AND TRADEMARK OFFICE
CERTIFICATE OF CORRECTION

| | | |
|---|---|---|
| PATENT NO. | : 7,683,888 B1 | Page 1 of 1 |
| APPLICATION NO. | : 10/789676 | |
| DATED | : March 23, 2010 | |
| INVENTOR(S) | : Peter Kennedy | |

It is certified that error appears in the above-identified patent and that said Letters Patent is hereby corrected as shown below:

In column 2, line 28, delete "sensative" and insert -- sensitive --, therefor.

In column 2, line 35, delete "sensative" and insert -- sensitive --, therefor.

In column 2, line 38, delete "sensative" and insert -- sensitive --, therefor.

In column 2, line 44, delete "sensative" and insert -- sensitive --, therefor.

In column 2, line 47, delete "sensative" and insert -- sensitive --, therefor.

In column 2, line 57, delete "coparison" and insert -- comparison --, therefor.

In column 2, line 58, delete "initating" and insert -- initiating --, therefor.

In column 3, line 11, delete "present" and insert -- present invention. --, therefor.

In column 3, line 15, delete "invention" and insert -- invention. --, therefor.

In column 9, line 33, delete "7A-F" and insert -- 7A-G --, therefor.

In column 12, line 2, delete "privedges" and insert -- privileges --, therefor.

In column 14, line 55, in Claim 8, after "recognizes" delete "the".

Signed and Sealed this
Twenty-second Day of November, 2011

David J. Kappos
*Director of the United States Patent and Trademark Office*